May 7, 1935.　　　　T. J. DAVIES　　　　2,000,744
WHEEL WRENCH
Filed Jan. 22, 1934
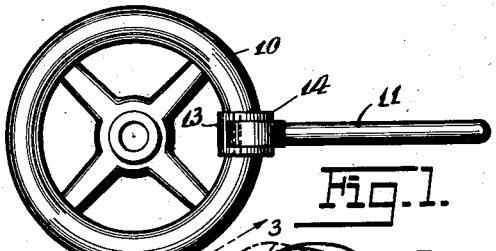
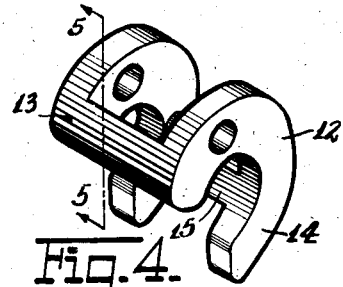
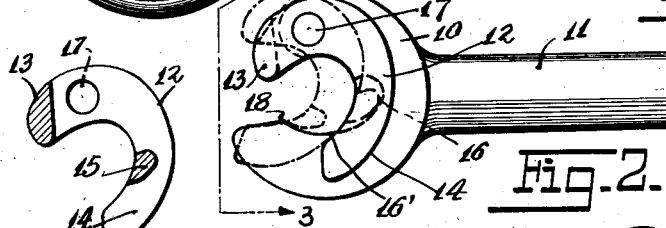
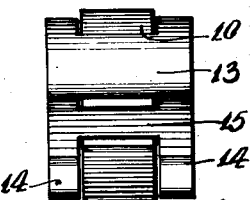
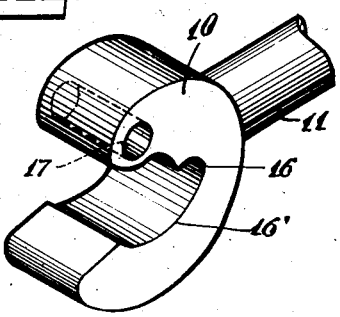
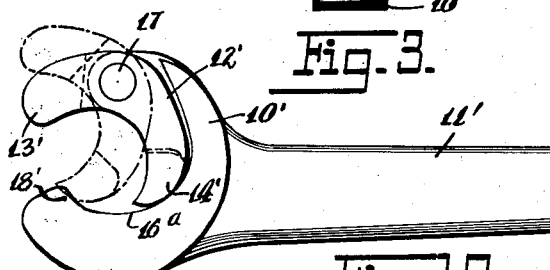
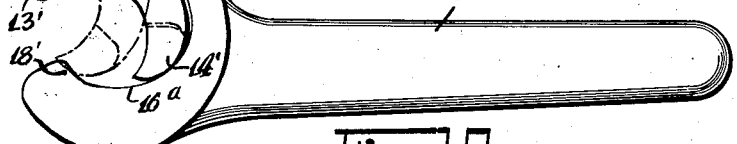
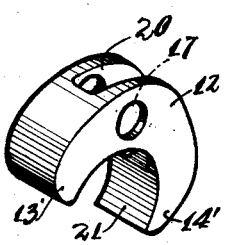
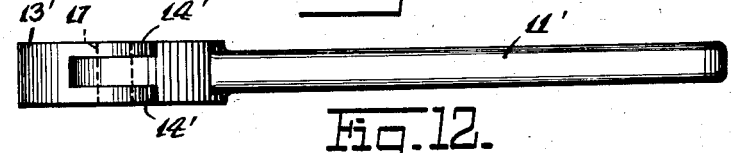
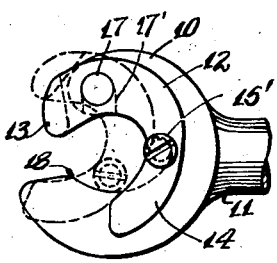
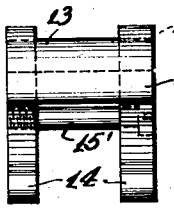
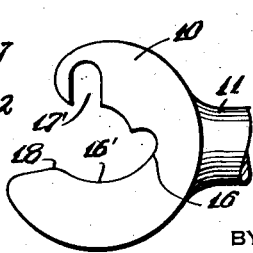
INVENTOR
TOM J. DAVIES.
BY
ATTORNEY Patented May 7, 1935

2,000,744

UNITED STATES PATENT OFFICE 2,000,744

WHEEL WRENCH

Tom J. Davies, New York, N. Y.

Application January 22, 1934, Serial No. 707,732

3 Claims. (Cl. 81—111)

This invention relates to new and useful improvements in a wheel wrench.

The invention has for an object the construction of an article as mentioned which is adapted to be engaged upon the rim of a wheel and automatically clutch the rim so that the wheel may be turned with a mechanical advantage of an extension or lever. This is particularly intended for the wheels of hand valves and other wheels which are liable to rust in and stick.

Still further the invention proposes arranging the wheel wrench with a stationary U-shaped jaw adapted to be engaged over the rim of a wheel, and a movable jaw mounted upon one end of the stationary jaw and arranged so as to automatically engage the rim of the wheel when the wrench is placed upon the rim.

Still further the invention proposes to so arrange the movable jaw that it automatically opens when the spanner is drawn from the rim of the wheel.

Furthermore as another object of this invention it is proposed to provide an arrangement whereby the movable jaw is intermediately pivotally mounted on the stationary U-shaped jaw and formed with a beak portion adapted to move inwards to grip the rim of the wheel in conjunction with the other arm of the U-shaped stationary jaw and also formed with a tail portion extending to the base of the U-shaped jaw for being moved when the spanner is engaged upon the rim of the wheel for moving the movable jaw to move the beak portion into gripping position.

Still further the invention proposes an arrangement whereby interengaging elements are arranged upon the tail portion of the movable jaw and one arm of the stationary jaw for preventing the tail portion from moving out from between the arms of said U-shape.

Still further an arrangement is proposed whereby an adjustment may be made to allow the tail portion of the movable edge to disengage from between the arms of the stationary jaw, and an arrangement to permit free moving out of the movable jaw in this disengaged position.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of a wheel with a wheel wrench engaged thereon according to this invention.

Fig. 2 is a side elevational view of the wrench per se.

Fig. 3 is an end elevational view of Fig. 2 seen as though looking in the direction of the line 3—3 of Fig. 2.

Fig. 4 is a perspective view of the movable jaw per se.

Fig. 5 is a sectional view taken on the line 5—5 of Fig. 4.

Fig. 6 is a fragmentary perspective view of the stationary jaw per se.

Fig. 7 is a fragmentary side elevational view similar to a portion of Fig. 2 but illustrating a modification of the invention.

Fig. 8 is an end elevational view of the movable jaw per se.

Fig. 9 is a side elevational view of the stationary jaw per se.

Fig. 10 is a side elevational view of another wheel wrench constructed according to the same invention.

Fig. 11 is a perspective view of the movable jaw per se.

Fig. 12 is a plan view of Fig. 10.

In Fig. 1 a plan view of a wheel 10 has been illustrated with the wrench shown engaged thereon to bring out that the wrench is adapted to extend radially and so provide a leverage for turning the wheel. The spanner is adapted to engage the rim of the wheel and transmit forces for the purpose of turning wheels which can not be turned otherwise or are not easily accessible. This wrench does not require that the wheels have spokes for the purpose of turning, as distinctly illustrated in Fig. 1.

The wheel wrench according to this invention comprises a stationary U-shaped jaw 10 connected with a handle 11. This handle is arranged upon the outer side of the bend of the U-shaped jaw. A movable jaw 12 is pivotally mounted upon the end of one of the arms of the U-shaped jaw 10. This movable jaw has a beak portion 13 extending to the front of the end of the arm of the stationary jaw for moving inwards to grip the rim of the wheel in conjunction with the other arm of the U-shaped stationary jaw. Furthermore the movable jaw is provided with a tail portion 14 extending to the base of the U-shaped jaw for being moved when the wrench is engaged with the rim of a wheel between the arms of the U-shaped jaw thereof for moving the movable jaw to move the beak portion into the gripping position.

The stationary jaw 10 is of constant width throughout its compass. The movable jaw 12 is arranged so that the beak portion 13 extends across the end of one of the arms of the U-shaped jaw, and the tail portions thereof extend along both sides of the stationary jaw. This is very clearly illustrated in Figs. 1 and 4.

A means is provided for preventing the tail portion 14 of the movable jaw from coming out from between the arms of the U-shaped stationary jaw. This means comprises a transverse element 15 between the tail elements 14 and extending into a groove 16 formed in the base of the stationary U-shaped jaw. The lower side of the groove 16 connects with an area 16′ which is concentric with the pivotal mounting of the movable jaw. More particularly a pintle rivet 17 extends through an intermediate portion of the movable jaw and through one of the arms of the U-shaped jaw. The surface 16′ is concentric with the axis of the pintle rivet 17. The tip end 18 of the free arm of the stationary jaw, is extended slightly inwards from the concentric surface 16′ so as to limit outward pivoting of the tail portions of the movable jaw.

The dot and dash lines in Fig. 2 indicate the open position of the movable jaw and the wrench is then adapted to be placed upon the rim of the wheel 10. As it is moved on to the rim the tail portions 14 will be moved inwards to the full line position shown in Fig. 2 which automatically pivots the movable jaw so that the beak portion 13 thereof clamps the rim of the wheel. The wrench is then engaged upon the wheel and may now be moved circumferentially to turn the wheel.

In Figs. 7-10 inclusive a modified form of the invention has been disclosed wherein provision is made for removing the movable jaw when desired. This is of advantage to replace the movable jaw after it has worn out, or should it break due to an accident. More particularly the movable jaw is very similar to the construction previously described except for the element 15′ extended between the tail portion thereof which in this case is a removable screw. Furthermore the arm of the stationary U-shaped jaw which supports the movable jaw is formed with a slot 17′ extended towards the surface 16′. In Fig. 7 the wrench is shown in assembled position. The dot and dash lines illustrate the other positions of the movable jaw. If desired the movable jaw may be removed by first removing the screw 15′ so that the tail portions thereof may be pivoted out from between the arms of the U-shaped jaw. Then the pintle pin 17 may be moved downwards out from the opening 17′. The movable jaw may now be reengaged or a new one substituted.

In Figs. 10-12 inclusive another variation of the invention has been shown which is substantially identical to that illustrated in Figs. 1-5 except for the arrangement of the parts. According to this arrangement the wrench comprises a stationary substantially U-shaped jaw 10′ connecting with the handle 11′. A movable jaw 12′ is pivotally mounted on the end of one of the arms of the U-shaped jaw and has a beak portion 13′ extending to the front of the end of the arm for moving inwards to grip the rim of a wheel in conjunction with the other arm of the U-shaped jaw.

The movable jaw also has a tail portion 14′ extending to the base of the U-shaped jaw for being moved inwards when the wrench is engaged upon the rim of a wheel for moving the movable jaw to move the beak into the gripping position. The movable jaw 12′ is of the same width as the width of the stationary jaw and the arm of the stationary jaw upon which the movable jaw is mounted is reduced as clearly illustrated in Fig. 12 and engages into an opening 20 formed in the movable jaw. The lower transverse portion 21 of the movable jaw corresponds with the transverse element 15 previously described.

In Fig. 10 the movable jaw is shown in the gripping position. The dot and dash lines show it moved into the open position. The pintle pin 17 serves to pivotally mount the movable jaw upon the arm of the stationary jaw. A portion 21 of the movable jaw moves along an arcuate portion 16ª upon the inner face of the opposed arm of the stationary jaw until it strikes against the portion 18′ which stops further outward motion. Thus the movable jaw is limited to move from the dot and dash line position to the full line position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a wheel wrench, a stationary substantially U-shaped jaw connected with a handle, a movable jaw pivotally mounted on the end of one of the arms of said U-shaped jaw and having a beak portion extending across and to the front of the end of said arm for moving inwards to grip the rim of a wheel in conjunction with the other arm of said U-shaped jaw and also having a tail portion comprising a pair of parallel fingers engaging against the sides of the first mentioned arm and connected by a transverse bar and extending to the base of said U-shaped jaw so that the tail portion is moved when the wrench is engaged with the rim of a wheel between the arms of the U-shaped jaw for moving the movable jaw to move the beak portion into gripping position.

2. A wheel wrench, comprising a stationary substantially U-shaped jaw connected with a handle, a movable jaw pivotally mounted on the end of one of the arms of said U-shaped jaw and having a beak portion extending to the front of the end of said arm for moving inwards to grip the rim of a wheel in conjunction with the other arm of said U-shaped jaw and also having a tail portion extending to the base of said U-shaped jaw for being moved when the wrench is engaged with the rim of a wheel between the arms of the U-shaped edge for moving the movable jaw to move the beak portion into gripping position, and means for preventing said tail portion from moving out from between the arms of said U-shaped jaw, comprising a removable element on said tail portion engaging one of the arms of said U-shaped jaw to limit outward pivoting of the movable jaw, and the pivotal mounting of said movable jaw located in a slot opening towards the other jaw.

3. A wheel wrench, comprising a stationary substantially U-shaped jaw connected with a handle, a movable jaw pivotally mounted on the end of one of the arms of said U-shaped jaw and having a beak portion extending to the front of the end of said arm for moving inwards to grip the rim of a wheel in conjunction with the other arm of said U-shaped jaw and also having a tail portion extending to the base of said U-shaped jaw for being moved when the wrench is engaged with the rim of a wheel between the arms of the U-shaped edge for moving the movable jaw to move the beak portion into gripping position, and means for preventing said tail portion from moving out from between the arms of said U-shaped jaw, comprising a removable element on said tail portion engaging one of the arms of said U-shaped jaw to limit outward pivoting of the movable jaw, and the pivotal mounting of said movable jaw located in a slot opening towards the other jaw, said removable element comprising a screw.

TOM J. DAVIES.